July 2, 1968 AKIRA HIROTA 3,391,248

SYSTEM AND APPARATUS FOR RECORDING AND REPRODUCING TELEVISION VIDEO SIGNALS

Filed May 2, 1967 3 Sheets-Sheet 1

July 2, 1968 AKIRA HIROTA 3,391,248

SYSTEM AND APPARATUS FOR RECORDING AND REPRODUCING TELEVISION VIDEO SIGNALS

Filed May 2, 1967 3 Sheets-Sheet 2

United States Patent Office
3,391,248
Patented July 2, 1968

3,391,248

SYSTEM AND APPARATUS FOR RECORDING AND REPRODUCING TELEVISION VIDEO SIGNALS

Akira Hirota, Tokyo, Japan, assignor to Victor Company of Japan, Limited, Moriya-cho, Kanagawa-ku, Yokohama, Japan Continuation-in-part of application Ser. No. 340,379, Jan. 27, 1964. This application May 2, 1967, Ser. No. 635,529
6 Claims. (Cl. 178—6.6)

ABSTRACT OF THE DISCLOSURE

The specification describes an improvement in multiple head, helical scan-type video, magnetic tape recorders. In greater detail, only one of two fields, which make each frame of the video signal, is recorded on a magnetic tape which travels at one half of the conventional running speed, the one field thus recorded is reproduced by both of the pair of magnetic heads, one after the other in succession, thereby reproducing a signal of one frame consisting of the two fields and constituting the original signal.

The system and apparatus for recording and reproducing television video signals according to this invention renders it possible to record and reproduce with substantially one half of the amount of the magnetic tape compared with that required for the conventional systems.

This application is a continuation-in-part of application Ser. No. 340,379, filed Jan. 27, 1964 and now abandoned.

The present invention relates to a system and apparatus for recording and reproducing television video signals, particularly to a system and apparatus which makes use of a video tape recorder provided with a plurality of magnetic heads wherein a magnetic tape is helically wound about half the periphery of a rotary disc provided with at least a pair of magnetic heads, said magnetic tape is caused to travel in one direction, and said rotary disk is caused to rotate so as to record the video signal on the magnetic tape with a sufficiently long loci inclined on the magnetic tape in its lengthwise direction, and in which renders it possible to record and reproduce with substantially one half of the amount of the magnetic tape compared with that required for the conventional systems.

Heretofore, methods have been proposed to decrease the amount of the magnetic tape required per unit television video signals at the sacrifice of the resolution of image in its transverse direction for the purpose of increasing the density of records. In such conventional means, however, sufficiently high density of records could not be obtained because it lowers the quality of the picture too much. It has also been proposed to increase the density of records still more, but at the sacrifice of the resolution of the image in its longitudinal direction. Such means, in general, has disadvantages in that it necessitates a complex device for converting the television system.

In order to accomplish these objects the present invention provides a system and apparatus for recording and reproducing television video signals. The recorded television video signal comprises one frame consisting of two fields, as in the conventional standard television video signals. However, only one of the two fields is recorded by one of a pair of magnetic heads on a magnetic tape moving at one half of the conventional running speed. The alternate fields thus recorded are reproduced by both of the pair of magnetic heads, one after the other in succession, thereby reproducing a signal of one frame consisting of the two fields and constituting the original signal.

The principal object of the present invention is to provide a system and apparatus for recording and reproducing television video signals, which renders it possible to record and reproduce television video signals with substantially one half of the amount of magnetic tape per unit signal, as compared with that required for the conventional system and apparatus for recording and reproducing television video signals.

Another object of the present invention is to provide a system and apparatus for recording and reproducing television video signals in which the amount of signal information to be recorded is reduced by one half, which results in a decrease of the necessary amount of the magnetic tape to about one half that required by the conventional system, and which is suitable for applying to a small type video tape recorder for use in industry or household etc. where there is no need for a completely accurate image resolution.

A further object to provide a system and apparatus for recording and reproducing television video signals, which permits simultaneously monitoring the recorded signal and still attaining the above mentioned object.

For a better understanding of the present invention, reference is made to the accompanying drawings, in which.

Figure 1:
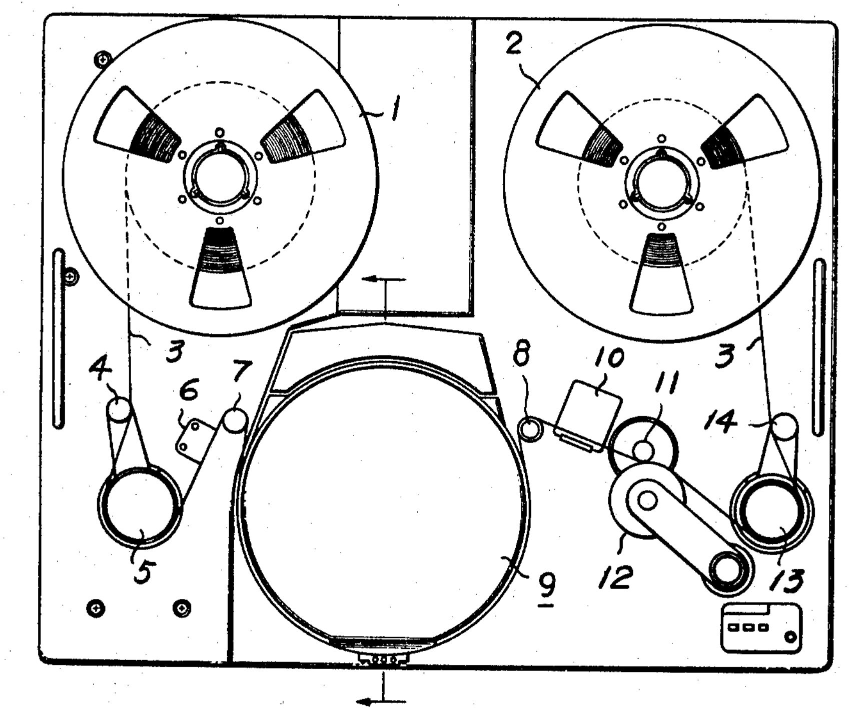
FIGURE 1 shows diagrammatically a plan view of the relative arrangement of one embodiment of a video tape recorder provided with two magnetic heads for which the invention is applied.

In FIG. 1, a magnetic tape supply reel 1 is arranged on a plane which is vertically higher than a take up reel 2. A magnetic tape 3, delivered from the supply reel 1, is fed via a flanged roller 5 having a tension arm 4 and a magnetic erasing head 6 erases any signal which was previously recorded on the tape over the whole width thereof during the recording operation. The tape is brought to a guide drum 9 enclosing therein a rotary disk 19, to be described hereinafter. The magnetic tape 3 is wound around the guide drum 9 for half the periphery in the shape of Ω by the aid of guide rollers 7 and 8. The magnetic tape 3 is then brought into contact with a stationary magnetic head 10 for recording an audio signal, control signal etc. and fed via a capstan 11, a pinch roller 12, adapted to press the tape 3 against the capstan 11, and a flanged roller 13 having a tension arm 14 to the take up reel 2 where the tape 3 is wound around it. Further, the capstan 11 causes the tape to travel at a predetermined speed slower than that in the conventional apparatus, as described later.

Figure 2:
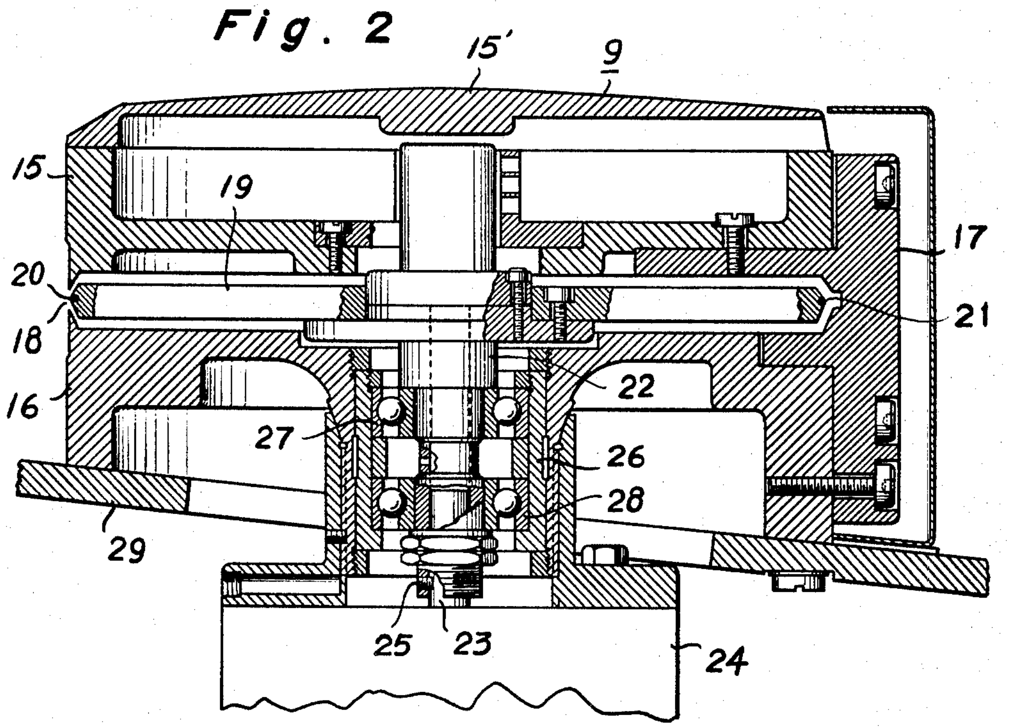
FIGURE 2 is an enlarged section of line A–B of a guide drum of the video tape recorder shown in FIGURE 1.

FIGURE 2 shows an enlarged sectional view taken on line A–B of the guide drum 9 shown in FIGURE 1. In FIGURE 2, an upper guide drum 15 is enclosed by a cover 15' and a lower guide drum 16 is arranged coaxially with the upper guide drum 15. The upper and lower guide drums 15 and 16 are supported by a supporting plate 17 so as to form a suitable gap 18 therebetween. A rotary disk 19 has, at its periphery, a pair of magnetic heads 20 and 21 arranged diametrically opposite one another. The rotary disk 19 is secured to a rotary shaft 22 so as to be rotated in the gap formed between the upper and lower guide drums 15 and 16. The magnetic heads 20 and 21 are secured to the rotary disk 19 so that these magnetic heads are located at different heights in a stepwise manner to be described hereinafter. A rotary shaft 23 of a motor 24 is fitted in the lower part of the rotating shaft 22 and secured thereto by means of a set screw 25. A bearing cartridge 26 comprises an upper bearing unit 27 and a lower bearing unit 28. A carrier plate 29 is used for supporting the above mentioned members.

The magnetic tape 3 is helically wound around the guide drum 9 for substantially half the periphery in a manner such that the longitudinal axis of the magnetic tape is inclined with respect to the rotating plane of the magnetic heads 20 and 21.

Next to be described is the recording operation of the inventive apparatus.

Figure 3:
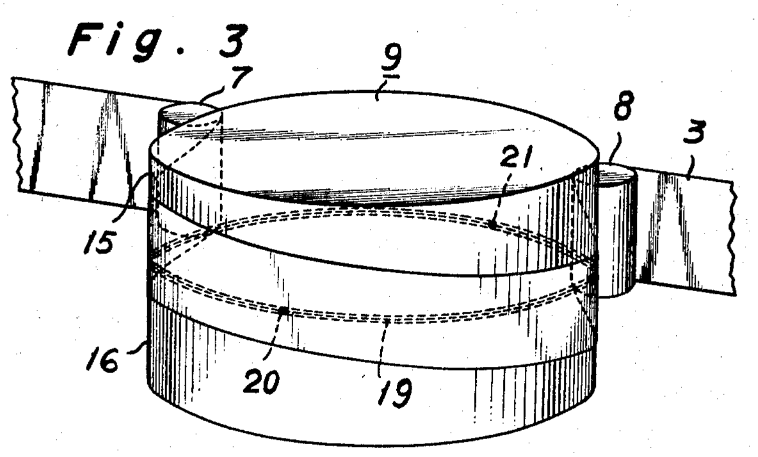
FIGURE 3 is a perspective view of the guide drum shown in FIGURE 2 wound by a magnetic tape.
Figure 4:
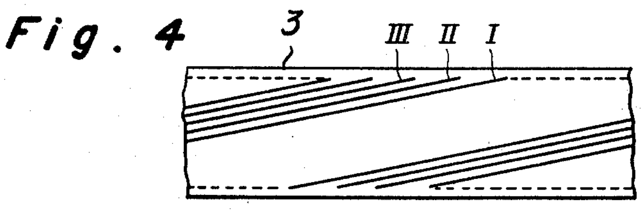
FIGURE 4 is an enlarged view of a part of the magnetic tape showing tracks recorded thereon by means of magnetic heads according to the invention.

The magnetic tape 3 is wound around the guide drum for half the periphery in the shape of Ω as shown in FIGURE 3. The rotating speed of the rotary disk 19 is made considerably greater than the peripheral speed of the magnetic tape 3 in order to record the signal on the tape 3 by means of the magnetic heads. Thus, there is recorded on the magnetic tape tracks having a sufficiently long loci and being inclined at an angle of $\theta$ on the magnetic tape with respect to its longitudinal direction, as shown in FIGURE 4 wherein each track includes the signals corresponding to one field.

Figure 5:
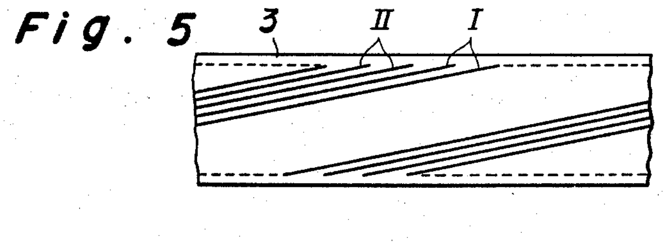
FIGURE 5 is an enlarged view of a part of the magnetic tape showing tracks recorded thereon by means of magnetic heads of the conventional apparatus.

If a video signal current is supplied to one of the magnetic heads 20 or 21, for example, to the magnetic head 20, and one frame of the video signal current consists of even and odd fields, then the one track recorded on the magnetic tape 3 consists of only one field signal. The other field of the same frame is not recorded on the magnetic tape. One field signal of the next frame is then recorded on the adjacent track. Accordingly, each of thus recorded tracks is formed by only one or the other of even and odd fields. At this time, the gap between each track can be made similar to that in the conventional system by determining the running speed of the magnetic tape to a predetermined speed of one half that required by the conventional system. Contrary to the above, in the conventional apparatus each frame shown by I, II, III . . . etc., as shown in FIGURE 5 consists of two tracks, each forming one field. In accordance with the system and apparatus according to the present invention, each frame shown by I, II, III . . . etc., in FIGURE 4 consists of only one track, which results in a decrease of the necessary amount of the magnetic tape by one half that required by the conventional system.

Moreover, one of the pair of magnetic heads 20 or 21, that is, the magnetic head 21, which was not used in the exemplary recording operation, is mounted on the rotary disk 19 in a stepwise manner with respect to the magnetic head 20 so that the magnetic head 21 scans the same track recorded by the magnetic track 20. Thus, the invention enables the magnetic head 21 to be used as a monitor head in the recording operation though the head reproduces only one field in a frame.

A reproducing operation of the invention will now be explained.

In case of reproducing the recorded signal, both of the magnetic heads 20 and 21 are caused to be operated. During one half period of one rotation of the rotary disk 19, the magnetic head 20 scans one of the recorded tracks such, for example, as the recorded track I in FIGURE 4 to reproduce one field. During another one half period of the same one rotation of the rotary disk 19, the magnetic head 21 comes into contact with the magnetic tape 3 and scans the same track I to reproduce the same one field. The fields thus reproduced by the magnetic heads 20 and 21, respectively, are added together to reproduce one frame signal consisting of two fields similar to the original signal. During next one rotation of the rotary disk 19, the two heads 20 and 21 scan the next adjacent track II in FIGURE 4, one after the other in succession to effect the reproducing operation. Thus, a continuous image picture can be reproduced.

Figure 6:
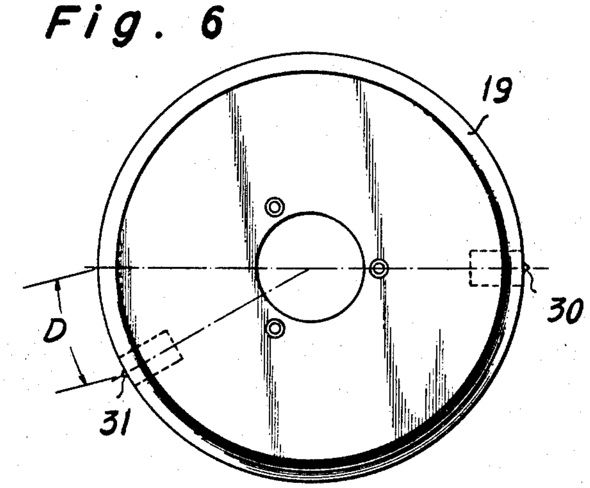
FIGURE 6 shows diagrammatically a plan view of the relative arrangement of the other embodiment of a rotary disk having magnetic heads for use in the present invention.
Figure 7:
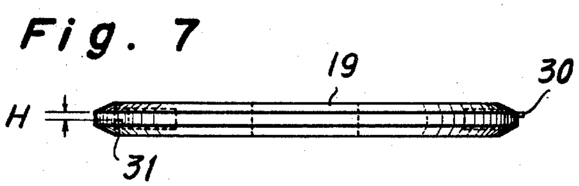
FIGURE 7 shows a sectional side view of the rotary disk shown in FIGURE 6.

Next, FIGURES 6 and 7 show the other embodiment of a rotary disk having magnetic heads for use in the present invention. A magnetic recording and reproducing head 30 records only one of even or odd fields on each track of the magnetic tape 3 in the recording operation, and reproduces the signal recorded on said track in the reproducing operation, as like as the magnetic head 20 in the first embodiment. A magnetic reproducing head 31 is mounted at a position where a distance D apart in a horizontal direction and a height H different in a vertical direction from the position diametrically opposite to said magnetic head 30 at the peripheral edge of the rotary disk 19, and is used only for reproducing said recorded track. If the magnetic tape running speed is determined as V, the frame numbers of the video signal every second as X, the angle of the recording track on the tape to the tape edge as $\theta$ and the length corresponding to a horizontal scanning period in the recording track on the tape as L, the following equations are given:

$$D=\frac{V}{2X}\cos\theta\pm\frac{1}{2}L,\ H=\frac{V}{2X}\sin\theta$$

Assume that the magnetic reproducing head 31 is on a plane which is lower, by the distance H, than the mounting plane of the magnetic recording and reproducing head 30. The magnetic reproducing head 31 is then mounted at a position on the circumference of disk 19 which is offset (in a counterclockwise direction), by the distance D, from a diameter of the disk 19 which runs through the magnetic head 30. This is shown in FIGURE 6. Conversely, if the head 31 is higher than the head 30, the offset distance D is in a clockwise direction. Or if the direction of tape travel is reversed, the offset directions are also reversed.

If the magnetic head 31 is mounted as described above, the portion, in which a field signal reproduced by said magnetic head 30 and a field signal reproduced by said magnetic head 31 overlap each other, can be made to minimum when the signals reproduced by said both heads are composed, and the signalless portion can be made to minimum. And further said magnetic head 31 can trace the same scanning track following said magnetic head 30, as described in the above embodiment. In said equation $$D=\frac{V}{2X}\cos\theta\pm\frac{1}{2}L,\ \frac{1}{2}L$$

is the term for which the signal recorded as even or odd fields, is reproduced as odd or even fields in interlaced relation. For example, if the value of $$\frac{V}{2X}\cos\theta \text{ is } 3.5L$$

the value of D becomes 3L or 4L, and if the recorded signal consists of odd fields, the odd fields are reproduced by the magnetic head 30, and in succession the signal traces of these odd fields are reproduced as even fields by the magnetic head 31, thereby each frame signal comprising two fields which renders it possible to interlace, can be reproduced.

Further, in this embodiment the switching positions of the reproducing signals by the magnetic heads 30 and 31 are selected before and after a vertical synchronizing signal which is in front or rear of each field video signal reproduced by the magnetic head 30. That is, a signal reproduced by the magnetic head 30 is used as the vertical synchronizing signal usually and is composed with a video signal out of a signal reproduced by the magnetic head 31.

Furthermore, the present invention can prevent from producing a signalless portion at the beginning of each field reproduced by said magnetic head 31 by winding the tape 3 over more than half portion of the periphery of the guide drum 9 so that each track includes more than one field signals, in said first embodiment without spacing said magnetic head 31 by D.

What I claim is:

1. A system for recording and playing back a video signal comprising a rotary body, means for mounting a magnetic recording and reproducing head and a magnetic reproducing head on the periphery of said rotary body, a magnetic recording medium, means for moving said recording medium past said rotary body at a predetermined speed for recording said video signal in parallel oblique tracks on said medium, means for rotating said rotary body with a velocity relative to said speed such that a video signal of one field is recorded in one track on said medium, means for applying said video signal of alternate fields to said magnetic recording and reproducing head, no video signal being applied to said magnetic reproducing head during a recording process, means for locating said reproducing head at a position on said rotary body wherein said reproducing head traces the track recorded by said recording and reproducing head with a time lag of one field period, a first means comprising said recording and reproducing head for playing back said video signal of alternate fields, a second means comprising said reproducing head for playing back said video signal of alternate fields with a time lag of one field period, and means for sequentially interlacing the signal reproduced by said first means with the signal reproduced by said second means.

2. A system for recording and playing back a video signal as defined in claim 1 and means comprising said reproducing head for playing back said video signal of alternate fields during the recording process, said playback being for a monitoring use.

3. A system for recording and playing back a video signal as defined in claim 1 wherein said reproducing head is mounted at a position on the peripheral edge of said rotary body in a plane which is parallel to the plane in which the recording and reproducing head is mounted.

4. A system for recording and playing back a video signal as defined in claim 1 in which said reproducing head is mounted in a rotating plane and at a position on the peripheral edge of said rotary body which is a predetermined distance apart from the position of a rotating plane in which said recording and reproducing head is mounted, said reproducing head being another distance apart from a position diametrically opposite to said recording and reproducing head so that there is a minimum overlap of the video signal reproduced by said recording and reproducing head and the video signal reproduced by said reproducing head.

5. A system for recording and playing back a video signal as defined in claim 1 wherein said first means includes said recording and reproducing head for playing back the video signal of alternate fields having vertical synchronizing signals in front and in rear thereof and said second means comprises said reproducing head for reproducing said video signal of alternate fields in which said vertical synchronizing signals are removed.

6. An apparatus for recording and reproducing television video signals comprising a rotary body provided on opposite sides of its periphery with a magnetic recording and reproducing head and a magnetic reproducing head, a magnetic medium, means for moving said medium past said rotary body at a predetermined speed, means comprising at least one of said heads for recording said video signal in parallel oblique tracks on said magnetic medium, means for rotating said rotary body with a velocity in which a video signal of one field is recorded in one track on said magnetic medium, means for applying said video signal of alternate fields to said magnetic recording and reproducing head, no video signal being applied to said magnetic reproducing head during a recording term, means for mounting said reproducing head at a position on the peripheral edge of said rotary body which is a distance D away from the diameter in a rotating plane of said recording and reproducing head and at a position which is a distance H apart in a vertical direction from said rotating plane, a first means for reproducing said video signal of alternate fields by said recording and reproducing head, a second means for reproducing said video signal of alternate fields with a time lag of one field period by said reproducing head during reproducing time, and means for sequentially interlacing the signal reproduced by said first means with the signal reproduced by said second means, wherein $$D \text{ equals } \frac{V}{2X} \cos\theta \pm \frac{1}{2}L,\ H \text{ equals } \frac{V}{2X} \sin\theta$$

V indicates a magnetic tape speed, X numbers of the frame of a video signal per every second, $\theta$ angle of the recorded track on said magnetic medium to the edge of said magnetic medium, and L length of the track corresponding to a horizontal scanning period.

References Cited

UNITED STATES PATENTS

| | | | |
|---|---|---|---|
| 2,921,124 | 1/1960 | Graham | 178—6 |
| 3,152,223 | 10/1964 | Wessels | 178—6.6 |
| 3,157,738 | 11/1964 | Okamura | 178—6.6 |

ROBERT L. GRIFFIN, *Primary Examiner.*

H. W. BRITTON, *Assistant Examiner.*